F. C. MILLER.
HOOD LOCK FOR AUTOMOBILES.
APPLICATION FILED MAR. 21, 1912.
1,047,679.
Patented Dec. 17, 1912.
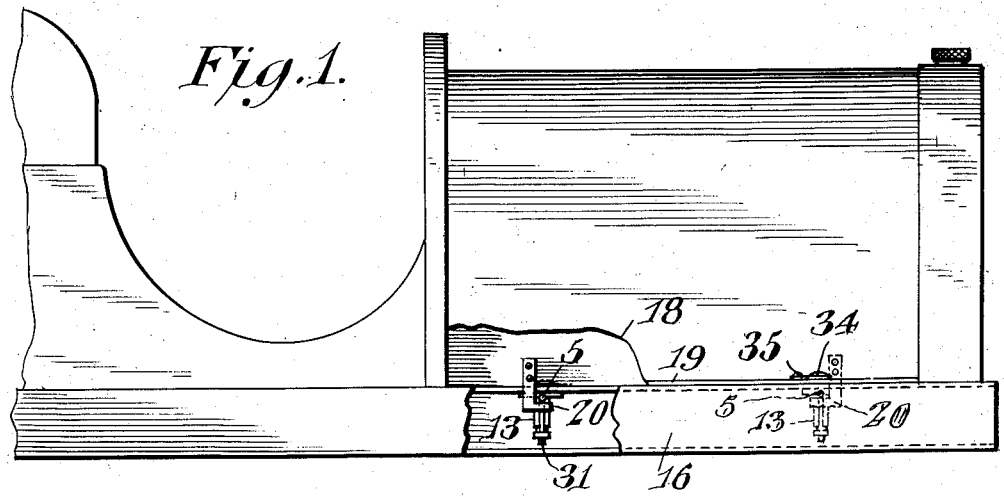
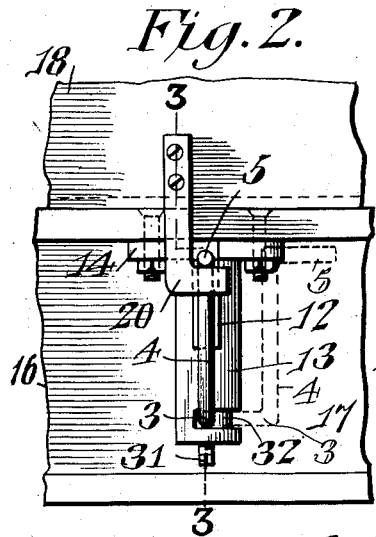
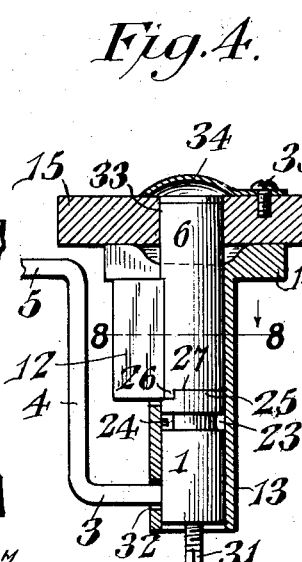
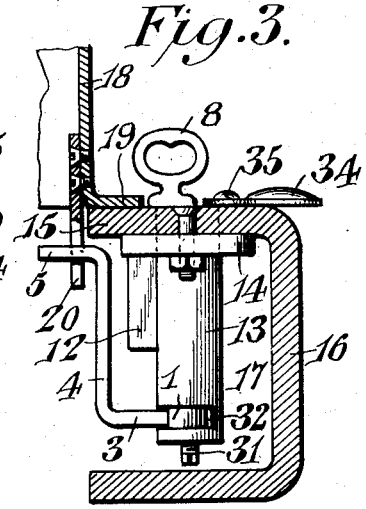
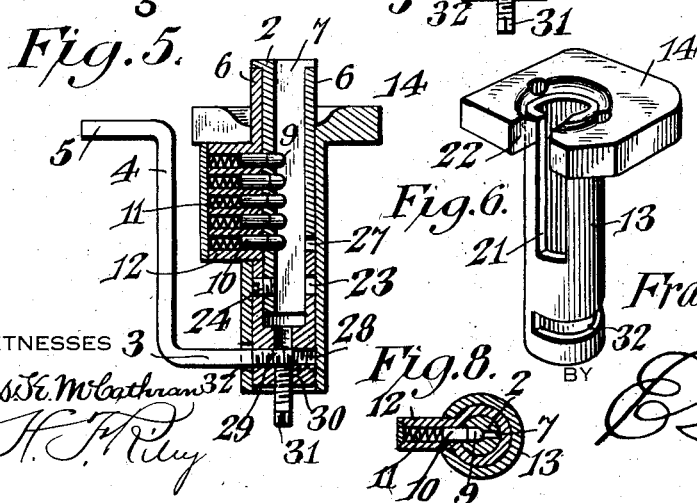
WITNESSES
Jas. F. McCathran
H. P. Riley
Franklin C. Miller
INVENTOR
BY E. G. Siggers
ATTORNEY

UNITED STATES PATENT OFFICE.

FRANKLIN C. MILLER, OF EASTON, PENNSYLVANIA.

HOOD-LOCK FOR AUTOMOBILES.

1,047,679.

Specification of Letters Patent. Patented Dec. 17, 1912.

Application filed March 21, 1912. Serial No. 685,320.

*To all whom it may concern:*

Be it known that I, FRANKLIN C. MILLER, a citizen of the United States, residing at Easton, in the county of Northampton and State of Pennsylvania, have invented a new and useful Hood-Lock for Automobiles, of which the following is a specification.

The invention relates to a hood lock for automobiles and other motor vehicles.

The object of the present invention is to provide for automobiles and other motor vehicles a simple, efficient and comparatively inexpensive lock, adapted to be readily applied to an automobile or analogous vehicle, and capable of securely locking the hood on the frame or chassis to prevent access to the motor by a thief or other unauthorized person.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a portion of an automobile provided with hood locks, constructed in accordance with this invention. Fig. 2 is an enlarged detail elevation of the hood lock and a portion of the hood and frame of the car or machine. Fig. 3 is a vertical sectional view on the line 3—3 of Fig. 2. Fig. 4 is a similar view on a slightly enlarged scale, the outer supporting sleeve being in section. Fig. 5 is a central vertical sectional view of the lock. Fig. 6 is a detail perspective view of the outer supporting sleeve. Fig. 7 is a detail view of the tubular bolt or sleeve, the locking arm being detached. Fig. 8 is a horizontal sectional view on the line 8—8 of Fig. 4.

Like numerals of reference designate corresponding parts in all the figures of the drawing.

In the accompanying drawing in which is illustrated the preferred embodiment of the invention, 1 designates a tubular bolt or sleeve rotatably mounted on the lower end of a vertical cylinder 2 and carrying a locking arm 3, having an L-shaped extension comprising a vertical portion 4 and a horizontal terminal engaging portion 5. The locking arm 3 extends horizontally from the bolt 1, and the vertical portion 4 is connected at its lower end to the outer terminal of the arm 3, and at its upper end to the inner terminal of the arm 5. The cylinder 2, which rotates within a lock casing 6, is provided with the key hole or slot 7 for the reception of a key 8 for operating co-acting tumbler pins 9 and 10, the pins 10 being pressed or urged inwardly by springs 11, housed in an off-set chamber 12 of the lock casing 6. The lock casing 6 is mounted in a vertical supporting sleeve 13, provided at its upper end with an integral attaching flange 14, secured by bolts or other suitable fastening means to the lower face of the upper flange 15 of a channeled bar or beam 16, constituting one of the members of the frame or chassis of the automobile. The hood lock is located within the groove or channel 17 of the bar or beam 16, and the hood 18 rests upon the upper face of the beam 16, being preferably provided with an outwardly extending horizontal flange 19, as clearly illustrated in Fig. 3 of the drawing. The hood is equipped at its inner face with a depending approximately L-shaped engaging member or keeper 20, consisting of a vertical portion and a horizontal portion, the vertical portion being secured at its upper end to the inner face of the hood, and the horizontal portion being located below the plane of the upper flange 15 of the beam 16, and below the plane of the horizontal portion of the extension of the arm 3 of the bolt, which, when turned by the means hereinafter described, carries the L-shaped extension of its arm into and out of engagement with the L-shaped keeper or member 20. The upper horizontal portion 5 of the arm of the bolt is carried to a position above the horizontal portion of the keeper 20, whereby the hood is locked against upward movement and is effectually prevented from being removed by a thief or other unauthorized person. The hood locks are preferably arranged in pairs, as indicated in Fig. 1 of the drawing, but any other arrangement may, of course, be employed.

The supporting sleeve 13 is provided in its upper portion with a vertical slot 21, receiving the off-set chamber 11 of the lock casing and having a branch 22 extending through the extension flange. The slot 21 and the branch 22 enable the lock to be readily fitted in the supporting sleeve in assembling the parts. The outer sleeve extends to the lower end of the tubular bolt or sleeve 1, and forms an outer casing for the same. The lower end of the cylinder projects below the lock casing 6 to receive the tubular bolt or sleeve 1, and it is adapted to make one complete revolution so that the key 8 can be inserted to operate the lock and removed after the latter is in locking position. The bolt, however, is intended to turn through approximately a quarter of a revolution to carry its extension to and from the keeper. For this purpose the bolt has a transverse arcuate slot 23 into which extends a stop 24, preferably in the form of a screw secured to the rotary cylinder. The upper or inner end of the tubular bolt or sleeve is provided with a projection 25, adapted to engage approximately diametrically disposed shoulders 26, formed by a recess 27 in the lower end of a lock casing. The projection 25 and the recess 27 are of a length to permit only the proper desired rotary movement of the tubular bolt or sleeve, while the slot 23 and the screw 24 constitute a lost motion connection between the cylinder and the bolt. The tubular sleeve or bolt is provided in its lower portion with a transverse opening 28 for the reception of the inner portion 29 of the locking arm 3, which is threaded to engage the threads of the opening 28. The threaded connection between the locking arm and the tubular bolt or sleeve enables the locking arm to be applied to the bolt after the parts of the lock have been assembled, and the bolt is also provided with a central threaded opening 30, extending upwardly or inwardly from the lower end of the bolt and intersecting the transverse opening and adapted to receive a set screw 31 for clamping the locking arm to maintain the same in proper position. The outer supporting sleeve is provided at its lower end with a transverse slot 32, through which the locking arm of the bolt extends and which permits the same to swing horizontally when actuated by the cylinder. The slot 23 is of a length to permit the desired independent rotary movement of the cylinder, and when rotated the stop 24 is carried along the slot 23 from one end of the same to the other end thereof, and through its engagement with the adjacent end wall actuates the bolt during the remainder of the rotary movement of the cylinder. A rotary movement of the cylinder in the opposite direction carries the stop or projection back through the slot 23 and into engagement with the other end wall thereof, thereby rotating the sleeve in the reverse direction from which it was first rotated. When the hood is locked, it is impossible for an unauthorized person to obtain access to the engine or motor.

The lock casing and the cylinder extend above the attaching plate of the outer supporting sleeve and pass through an opening 33 in the upper flange 15 of the channeled beam or member of the frame of the car, and the upper end of the lock is normally covered by a cap plate or closure 34, secured to the channeled bar or beam 16 by a pivot 35, and movable to and from a position over the top of the lock. The cap plate or cover is adapted to exclude dust, dirt, water and other accumulation from the lock to prevent the same from becoming clogged and inoperative.

What is claimed is:—

1. In a device of the class described, the combination with the frame member, and a hood supported upon the same, of a keeper or member connected with the hood and depending therefrom at the inner side of the frame member, and a lock arranged within the frame member and including a rotary bolt, key controlled means for actuating the bolt, and an arm mounted on the bolt and carried into and out of engagement with the keeper by the rotary movement of the said bolt.

2. In a device of the class described, the combination with a frame member, and a hood supported upon the same, of an approximately L-shaped keeper depending from the hood at the inner side of the frame member, and a lock located within the frame member and including a vertically disposed rotary bolt, key controlled means for actuating the bolt, and an arm mounted on the bolt and extending horizontally therefrom and having an extension carried into and out of engagement with the keeper through the rotary movement of the bolt.

3. In a device of the class described, the combination with a frame member, and a hood supported upon the same, of an approximately L-shaped keeper depending from the hood at the inner side of the frame member, and a lock located within the frame member and including a vertically disposed rotary bolt, key controlled means for actuating the bolt, and an arm extending horizontally from the bolt and provided with an approximately L-shaped extension consisting of a vertical portion extending upwardly from the arm, and a horizontal portion projecting from the upper end of the vertical portion and carried into and out of engagement with the keeper through the rotary movement of the bolt.

4. In a device of the class described, the combination with a channeled horizontal frame member, and a hood supported upon the same, of a keeper depending from the hood at the inner side of the frame member, and a lock located within the frame member and including a vertical supporting sleeve secured to and depending from the top of the frame member and provided at its upper portion with a longitudinal slot and having a transverse slot located below the longitudinal slot, a lock casing arranged within the supporting sleeve and having an off-set chamber extending through the longitudinal slot, a cylinder rotatably mounted within the lock casing and extending below the same, a tubular bolt mounted on the lower end of the cylinder and connected therewith, key released means arranged within the lock casing at the off-set chamber for controlling the turning of the cylinder, and an arm extending through the transverse slot of the supporting sleeve and mounted on the tubular bolt and carried by the rotary movement thereof into and out of engagement with the keeper.

5. In a device of the class described, the combination with a channeled frame member, and a hood supported upon the same, of a keeper connected with the interior of the hood and depending therefrom at the inner side of the said frame member, and a lock arranged within the groove or channel of the frame member and comprising a supporting sleeve secured to and depending from the top of the frame member, a lock casing rigidly mounted within the supporting sleeve and extending upwardly through the top of the frame member, a cylinder rotatably mounted within the lock casing and extending below the same, a tubular bolt located within the supporting sleeve and mounted on the lower portion of the cylinder and provided with an arm arranged to engage the keeper of the hood, key released means for controlling the turning of the cylinder, and a lost motion connection between the bolt and the cylinder to permit the latter to make a complete turn while the bolt is given a partial turn.

6. In a device of the class described, the combination with a channeled frame member, and a hood supported upon the same, of a keeper connected to the inner face of the hood and depending below the top of the channeled frame member at the inner side thereof, a lock located within the channeled frame member and secured to and depending from the top thereof and including a lock casing, a cylinder rotatably mounted in the same, a bolt connected with the cylinder, and a locking arm mounted upon the bolt at the lower portion of the frame member and extending upwardly to the plane of the keeper and having a top engaging portion carried into and out of engagement with the keeper by the rotary movement of the bolt.

In testimony that I claim the foregoing as my own, I have hereto affixed my signature in the presence of two witnesses.

FRANKLIN C. MILLER.

Witnesses:
S. S. HORN,
RUSSELL D. WELCH.